(12) United States Patent
Mori et al.

(10) Patent No.: US 7,530,421 B2
(45) Date of Patent: May 12, 2009

(54) VEHICLE DRIVE POWER DISTRIBUTION DEVICE

(75) Inventors: Atsuhiro Mori, Fujisawa (JP); Shinichi Suzuki, Zama (JP); Hirotaka Kusukawa, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 227 days.

(21) Appl. No.: 11/500,198

(22) Filed: Aug. 7, 2006

(65) Prior Publication Data

US 2007/0029127 A1     Feb. 8, 2007

(30) Foreign Application Priority Data

Aug. 8, 2005     (JP)     ............... 2005-228982

(51) Int. Cl.
*B60K 17/344* (2006.01)

(52) U.S. Cl. ........................ 180/248; 180/247

(58) Field of Classification Search ............ 180/248, 180/247, 76, 24.09
See application file for complete search history.

(56) References Cited

U.S. PATENT DOCUMENTS

| | | | | |
|---|---|---|---|---|
| 4,739,678 A | * | 4/1988 | Miura et al. ............... | 74/665 T |
| 5,086,867 A | * | 2/1992 | Hirota et al. ............... | 180/248 |
| 5,254,052 A | * | 10/1993 | Kobayashi ................. | 475/249 |
| 5,415,598 A | * | 5/1995 | Sawase et al. ............. | 475/86 |
| 5,868,642 A | * | 2/1999 | Kobayashi ................. | 475/203 |
| 5,941,136 A | * | 8/1999 | Kusukawa et al. ........ | 74/606 R |
| 5,984,821 A | * | 11/1999 | Showalter ................. | 475/204 |
| 6,135,229 A | * | 10/2000 | Arimatsu .................. | 180/248 |
| 6,595,086 B2 | * | 7/2003 | Kobayashi ................. | 74/665 T |

* cited by examiner

*Primary Examiner*—Paul N Dickson
*Assistant Examiner*—Tashiana Adams
(74) *Attorney, Agent, or Firm*—Global IP Counselors, LLP (57) ABSTRACT

A transfer mechanism distributes drive power from a drive power source of a motor vehicle to left and right front wheels and left and right rear wheels of the vehicle. A rear differential mechanism transfers the drive power to the left and right rear wheels. A clutch is provided between the rear differential mechanism and each of the left and right rear wheels. A control device independently controls an engaged state of each of the clutches. A speed-increasing mechanism sets revolution speeds of an output shaft of the transfer mechanism and of an input shaft of the rear differential mechanism to be the same and sets a speed of the outer circumference of the rear wheel to which the drive power is transferred, via an engaged clutch, to be faster than a speed of the outer circumference of the left and right front wheels.

16 Claims, 5 Drawing Sheets

VEHICLE DRIVE POWER DISTRIBUTION DEVICE

CROSS-REFERENCE

The present application claims priority under 35 U.S.C. § 119 of Japanese Patent Application No. 2005-228982, filed on Aug. 8, 2005, the entire content of which is expressly incorporated by reference herein.

FIELD

The present invention relates to a vehicle drive power distribution device in which the front wheels and rear wheels are driven by drive power from a drive power source.

BACKGROUND

An example, such as Patent Application Publication No. H2-283529, of conventional technology for a vehicle drive power distribution device is one in which the drive power distribution device is for a vehicle equipped with a front wheel power transfer pathway that transfers drive power from a power source to the right and left front wheels and a rear wheel power transfer pathway that transfers the drive power from the power source to the right and left rear wheels via a clutch. For this type of device, a propeller shaft that is partitioned into two parts is provided between the transfer mechanism at the front wheel side and the rear differential mechanism at the rear wheel side, a transmission is provided between this partitioned propeller shaft, and the rear differential mechanism is linked to the left and right rear wheels via the clutch to constitute the rear wheel power transfer pathway.

SUMMARY

For the conventional vehicle drive power distribution device, since the transmission provided midstream of the propeller shaft arranged between the transfer mechanism and the rear differential mechanism comprised a speed-increasing gear train, a constant speed clutch, and a speed-increasing clutch, this created a problem in that no other component could be disposed between the transfer mechanism and the rear differential mechanism.

An embodiment of the present invention provides a vehicle drive power distribution device that can achieve a rear wheel speed-increasing function and a left and right drive power independent control function, while ensuring the space between the transfer mechanism and the rear differential mechanism.

For one embodiment, a vehicle drive power distribution device, in which the left and right front wheels and left and right rear wheels are driven by drive power from the drive power source, includes a transfer mechanism that distributes the drive power from the aforementioned power source to the left and right front wheels and the left and right rear wheels, a rear differential mechanism that transfers the drive power transferred from the aforementioned power source via the aforementioned transfer mechanism to the left and right rear wheels, a first clutch provided between the rear differential mechanism and the left rear wheel, a second clutch provided between the rear differential mechanism and the right rear wheel, a control device that independently controls the engaged state of the first clutch and the engaged state of the second clutch, and a speed-increasing mechanism that sets the revolution speed of the output shaft of the transfer mechanism and the revolution speed of the input shaft of the rear differential mechanism to be the same and sets the speed of the outer circumference of the rear wheel to which the drive power is transferred via the engaged clutch to be faster than the speed of the outer circumference of the left and right front wheels, while at least one of either the first or second clutches is in the engaged state.

For other embodiments of the vehicle drive power distribution device, the moving speed of the rear wheels can be made faster than that of the front wheels without shifting gears between the transfer mechanism and the rear differential at the rear wheel side. In other words, the space between the transfer mechanism and the rear differential mechanism can be ensured, thus allowing for a greater degree of freedom in constituting the layout as compared to when a transmission for shifting gears is disposed between the transfer mechanism and the rear differential mechanism at the rear wheel side.

DETAILED DESCRIPTION

Next is provided a detailed explanation of exemplary embodiments of the present invention with reference to Embodiments 1 and 2, as shown in the drawings.

Figure 1:
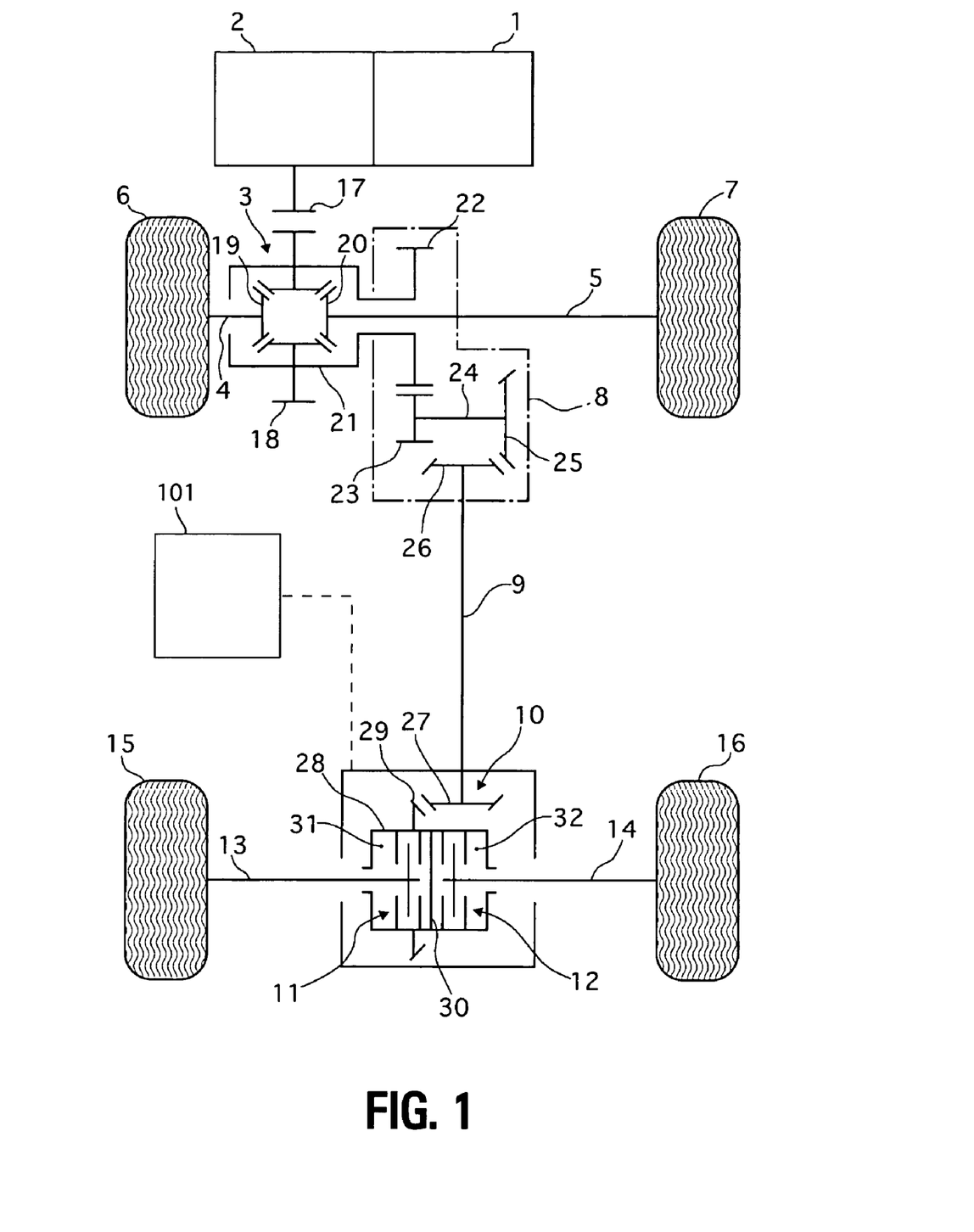
FIG. 1 is a skeleton diagram showing the drive system for a four-wheel drive vehicle with a four-wheel drive base to which the drive power distribution device for Embodiment 1 has been applied.
Figure 2:
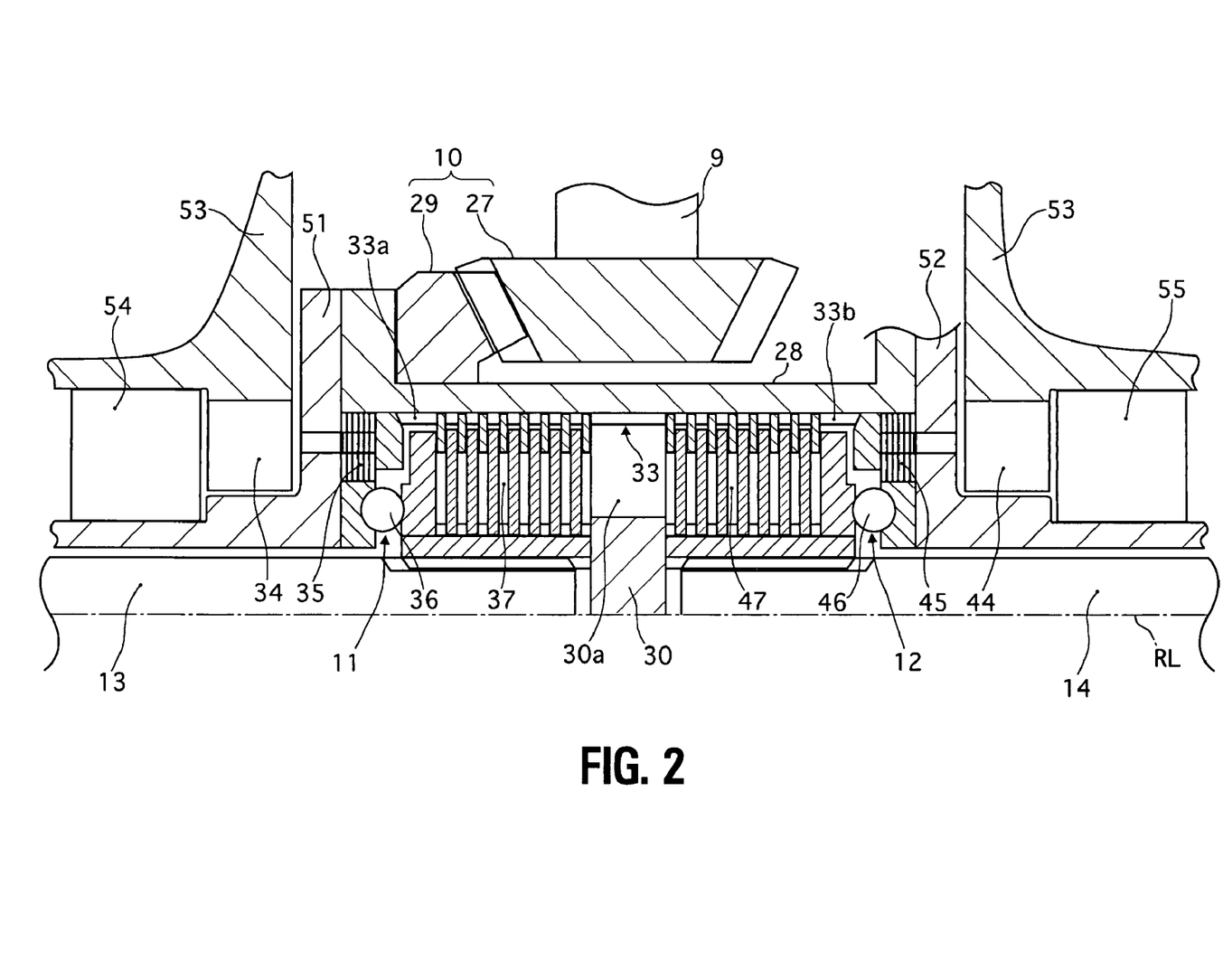
FIG. 2 is a cross-sectional diagram showing the rear final gear mechanism and the rear clutch mechanism of the rear wheel power transfer pathway for Embodiment 1.

FIG. 1 is a skeleton diagram of the drive system for a four-wheel drive vehicle with a four-wheel drive base to which the drive power distribution device for Embodiment 1 has been applied. FIG. 2 is a cross section diagram showing the rear final gear mechanism (rear differential mechanism) and the rear clutch mechanism of the rear wheel power transfer pathway for Embodiment 1. As shown in FIG. 1, the vehicle drive power distribution device for Embodiment 1 is equipped with engine 1, transmission 2, front differential mechanism 3, left front wheel drive shaft 4, right front wheel drive shaft 5, left front wheel 6, right front wheel 7, transfer gear mechanism 8 (the transfer mechanism), propeller shaft 9, rear final gear mechanism 10 (the rear differential mechanism), first clutch 11, second clutch 12, left rear wheel drive shaft 13, right rear wheel drive shaft 14, left rear wheel 15 and right rear wheel 16.

The power source is made up of engine 1 and transmission 2. The front wheel power transfer pathway, which transfers the drive power from the power source to the left and right front wheels 6 and 7, is comprised of transmission output gear 17, drive gear 18, front differential mechanism 3, which permits the differential of the drive power from the power source to left and right front wheels 6 and 7 and performs equidistribution. The front wheel power transfer pathway further includes and left front wheel drive shaft 4 and right front wheel drive shaft 5 provided on side gears 19 and 20 of front differential mechanism 3.

The rear wheel power transfer pathway that transfers the drive power from the power source by means of engine 1 and transmission 2 via the clutch to left and right rear wheels 15 and 16 links transfer gear mechanism 8 on the front wheel side to rear final gear mechanism 10 on the rear wheel side via only propeller shaft 9, links rear final gear mechanism 10 from its drive output portion to left rear wheel drive shaft 13 via first clutch 11 and links rear final gear mechanism 10 from its drive output portion to right rear wheel drive shaft 14 via second clutch 12.

Transfer gear mechanism 8 comprises input gear 22, which is integrally rotatable with differential case 21 of front differential mechanism 3, counter gear 23 that engages with said input gear 22, counter shaft 24 on which is provided said counter gear 23, first ring gear 25 provided on the end of said counter shaft 24, and first hypoid gear 26 provided on the end of propeller shaft 9 at the front wheel side and that engages with said first ring gear 25.

Rear final gear mechanism 10 comprises second hypoid gear 27 (hypoid gear) provided on the end of propeller shaft 9 and second ring gear 29 (ring gear) fixed to cylindrical differential case 28 that has axis RL. Axis RL is the central axis of cylindrical differential case 28, left rear wheel drive shaft 13 and right rear wheel drive shaft 14. Second ring gear 29 engages with said second hypoid gear 27.

Gear ratio TG of transfer gear mechanism 8 and gear ratio FG of rear final gear mechanism 10 is set as a speed-increasing gear ratio that increases the speed of rear wheels 15 and 16 more than that of front wheels 6 and 7. This speed-increasing gear ratio is set so that the speed of rear wheels 15 and 16 is about 2 to about 5 percent faster than that of front wheels 6 and 7 by suppressing the difference in the clutch input revolution speed to the rear wheel on the outside turning wheel side of left and right rear wheels 15 and 16 to a minimum when a great deal of cornering is required for the turn in order to reduce the drive power transfer loss.

First clutch 11 and second clutch 12 are independent variable control type clutches that independently control the switching of the transfer torque from the outside. Cylindrical differential case 28 is provided with partition wall 30 in the middle of the inner surface of the cylinder, first clutch chamber 31 and second clutch chamber 32 are formed separately from said partition wall 30, and first clutch 11 is disposed in first clutch chamber 31 and second clutch 12 is disposed in second clutch chamber 32.

As shown in FIG. 2, aforementioned first clutch 11 is a multiple disk clutch comprised of first spline teeth 33a formed on the inner surface of first clutch chamber 31 of cylindrical differential case 28 and first main clutch plate 37 (the first clutch plate) inserted between the ends of left rear wheel drive shaft 13, which is inserted into first clutch chamber 31. This electromagnetic clutch, first clutch 11, comprises first pilot clutch plate 35 that generates constraining torque in accordance with the coil current command sent to first electromagnet 34, first ball cam 36 that generates the cam force in accordance with the constraining torque of first pilot clutch plate 35, and first main clutch plate 37 that generates the transfer torque by means of the thrust from the cam force of first ball cam 36.

As shown in FIG. 2, second clutch 12 is a multiple disk clutch comprised of second spline teeth 33b formed on the inner surface of second clutch chamber 32 of cylindrical differential case 28 and second main clutch plate 47 (the second clutch plate) inserted between the ends of right rear wheel drive shaft 14, which is inserted into second clutch chamber 32. This electromagnetic clutch, second clutch 12, comprises second pilot clutch plate 45 that generates constraining torque in accordance with the coil current command sent to second electromagnet 44, second ball cam 46 that generates the cam force in accordance with the constraining torque of second pilot clutch plate 45, and second main clutch plate 47 that generates the transfer torque by means of the thrust from the cam force of second ball cam 46. In FIG. 2, reference numbers 51 and 52 refer to end covers for cylindrical differential case 28, reference number 53 refers to a unit housing, and reference numbers 54 and 55 refer to bearings that support end covers 51 and 52 to unit housing 53.

Figure 4:
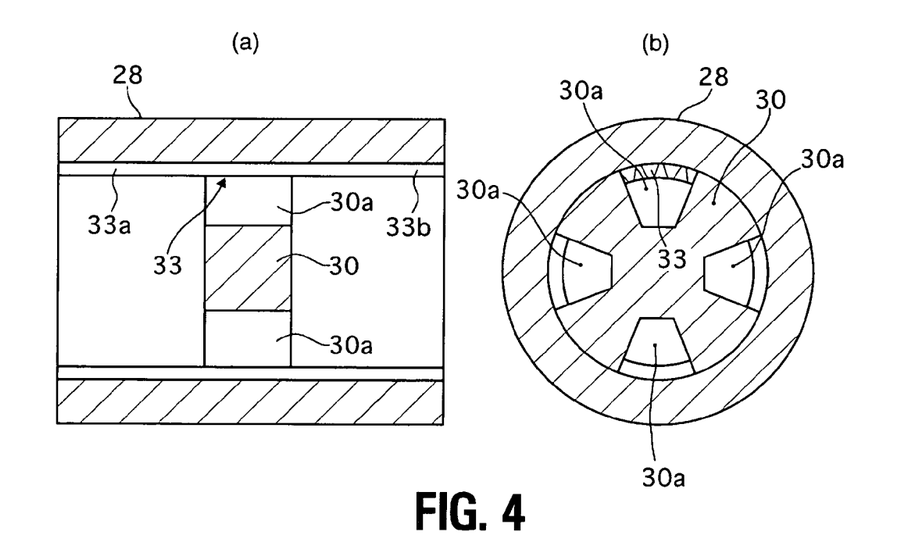
FIG. 4 is a cross-sectional diagram showing the spline teeth processing for when a partition wall with a plurality of through-holes is installed in the middle of the inner surface of the cylindrical differential case for Embodiment 1.

Cylindrical differential case 28 forms a plurality of through holes 30a that penetrate through partition wall 30 in the axial direction and also forms shared spline teeth 33, which are shared by first spline teeth 33a and second spline teeth 33b, along the entire length of the case only at the portion where the plurality of through holes 30a are formed. Four through holes are formed for through holes 30a by forming 45 degree spread angles, as shown in FIG. 4, for example, to create fan-shaped through holes at equal intervals in the circumferential direction.

For the drive power distribution device described in Embodiment 1, the drive power distribution control to the front and rear wheels is performed by reinforcing the engaging force between first clutch 11 and second clutch 12 from the front wheel drive state in which first clutch 11 and second clutch 12 are released in order to gradually increase the drive power distribution to the rear wheels so as to reinforce the 4-wheel drive tendency, thus allowing for a seamless front-to-rear distribution. In addition, the drive power distribution control to left and right rear wheels 15 and 16 is performed by independently controlling the engagement/release of first clutch 11 and second clutch 12 in order to provide continuous distribution from 100 vs. 0 to 0 vs. 100, thus allowing for a seamless rear-wheel left-to-right distribution.

Furthermore, the front-to-rear/rear-wheel left-to-right drive power distribution control is performed by a controller 101 in FIG. 1 that calculates the optimum drive power distribution by detecting the operation performed by the driver and the behavior and running state of the vehicle based on information from the steering angle sensor, the transverse G sensor, the yaw rate sensor, the vehicle speed sensor and the accelerator opening sensor, and based on the result of the calculation, outputs a separate coil current command for first electromagnet 34 of first clutch 11 and second electromagnet 35 of second clutch 12.

Therefore, when traveling at cruising speed on straight roads in the front-wheel drive state in which first clutch 11 and second clutch 12 are released, loss can be suppressed to a minimum and an excellent fuel consumption rate can be achieved. In addition, when taking off or accelerating forward in a straight direction, the drive power distribution to the rear wheels is gradually increased so as to reinforce the 4-wheel drive tendency and achieve excellent drive performance by suppressing the drive slip.

On the other hand, when accelerating while turning, since the rear wheel on the outside turning wheel side of left and right rear wheels 15 and 16 passes through a trajectory that is more on the outside than the average trajectory of left and right front wheels 6 and 7, the rear wheel on the outside turning wheel side cannot catch up with the front wheels if all four wheels are rotating at the same speed, resulting in a phenomenon whereby the drive power cannot be efficiently transferred to the rear wheel on the outside turning wheel side. Conversely, for Embodiment 1, since the speed of rear wheels 15 and 16 is set to be faster than that of front wheels 6 and 7 by means of the gear ratio TG setting for transfer gear mechanism 8 and the gear ratio FG setting for rear final gear mechanism 10, the loss in drive power transfer is reduced due to the difference in trajectory between the front and rear wheels when turning, resulting in improved turning movement performance of the vehicle.

Therefore, for example, when right rear wheel 16 is the outside turning wheel when the vehicle turns left, second clutch 12 is strongly engaged while the difference in the input/output revolution speed for clutch 12 is minimized due to the increase in speed, and first clutch 11 is either released or slightly engaged so as to create a difference in torque between left and right rear wheels 15 and 16 by making the drive torque of left rear wheel 15, which is the inside turning wheel, low, and the drive torque for right rear wheel 16, which is the outside turning wheel, high, and due to this difference in torque, a yaw moment occurs in the turning direction around the center of gravity of the vehicle and the cornering performance is improved.

Furthermore, when decelerating during the turn with the accelerator off, control is performed by applying a difference in torque between left and right rear wheels 15 and 16 so that a yaw moment occurs in the direction in which the behavior of the vehicle is stabilized due to the difference in torque between left and right rear wheels 15 and 16, or in other words, if the vehicle has a tendency to oversteer, the direction in which the vehicle will understeer around its center of gravity, thus ensuring turning stability.

In addition, when controlling the behavior of the vehicle by a sudden maneuver of the steering wheel when trying to avoid an obstacle or avoid swerving, control can be performed by applying a difference in torque between left and right rear wheels 15 and 16 in order to generate a yaw moment in a direction that avoids obstacles or swerving around the center of gravity of the vehicle and thereby assist in avoiding such obstacles or veering off course.

For a constitution in which first clutch 11 and second clutch 12 are provided on the left and right sides and the rear clutch mechanism, which independently controls the drive power of these clutches, is integrally installed as one unit on cylindrical differential case 28, said cylindrical differential case 28 must have a function in which it is mated to the clutch plate and a function in which it receives the reactive force of first clutch 11 and second clutch 12.

Figure 3:
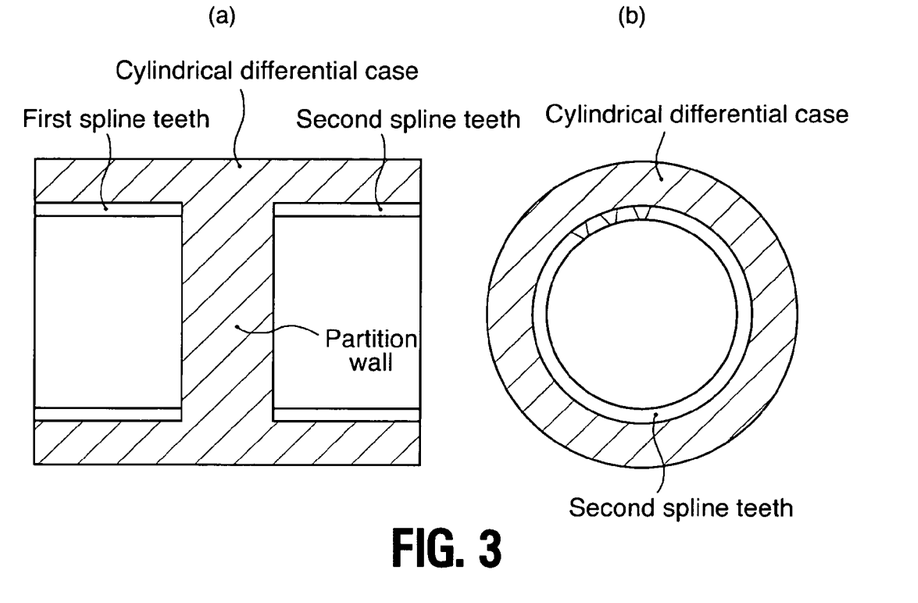
FIG. 3 is a cross-sectional diagram showing an example of conventional spline teeth processing for when a partition wall is installed in the middle of the inner surface of the cylindrical differential case.

In order to satisfy the aforementioned functions, a structure, such as that shown in FIG. 3, is provided in which first spline teeth and second spline teeth are formed on the inner surface of the case so as to mate with the clutch plate, and a partition wall is provided in the middle for receiving the reactive force, thus forming the first spline teeth and the second spline teeth by means of a milling process performed from both sides. However, when this is performed, the spline teeth processing performance deteriorates because the tooth-cutting process involves two processes, and the spline teeth can only be processed up to the area near the partition wall. In addition, a problem occurs in that the total mass increases in order to ensure the thickness of the partition wall.

In order to counteract the aforementioned problems, for the drive power distribution device in Embodiment 1, cylindrical differential case 28 forms a plurality of through holes 30*a* that penetrate through partition wall 30 in the axial direction and also forms shared spline teeth 33, which are shared by first spline teeth 33*a* and second spline teeth 33*b*, along the entire length of the case only at the portion where the plurality of through holes 30*a* are formed. Therefore, only one process from one direction need be performed for the tooth-cutting process and shared spline teeth 33 that are formed continuously even at partition wall 30 can be processed, resulting in improved processing performance of shared spline teeth 33. In addition, by forming through-holes 30*a* in partition wall 30, for which the thickness has been ensured, the total mass is reduced by the amount that is taken up by through-holes 30*a*, allowing for a reduction in weight.

The following effects, as described below, can be achieved for the vehicle drive power distribution device pertaining to Embodiment 1.

Effect 1: For the vehicle drive power distribution device equipped with a front wheel power transfer pathway that transfers the drive power from the drive power source to left and right front wheels 6 and 7 and a rear wheel power transfer pathway that transfers the drive power from the drive power source to left and right rear wheels 15 and 16 via a clutch, the aforementioned rear wheel power transfer pathway links transfer gear mechanism 8 at the front wheel side to rear final gear mechanism 10 at the rear wheel side via only propeller shaft 9, links aforementioned rear final gear mechanism 10 from its drive output portion to left rear wheel drive shaft 13 via first clutch 11, links aforementioned rear final gear mechanism 10 from its drive output portion to right rear wheel drive shaft 14 via second clutch 12, sets the gear ratio TG of aforementioned transfer gear mechanism 8 and the gear ratio FG of aforementioned rear final gear mechanism 10 to the speed-increasing gear ratio that increases the speed of rear wheels 15 and 16 to be faster than that of front wheels 6 and 7, and since first clutch 11 and second clutch 12 are independent variable control type clutches that independently control the switching of the transfer torque from the outside, a greater degree of freedom in constituting the layout is ensured, friction loss, the cost and the weight can be reduced and a rear wheel speed-increasing function as well as a left/right drive power independent control function are achieved.

Effect 2: Since the speed-increasing gear ratio obtained from the gear ratio TG of transfer gear mechanism 8 and the gear ratio FG of rear final gear mechanism 10 is set to increase the speed of rear wheels 15 and 16 by about 2 to about 5 percent more than that of front wheels 6 and 7, when the clutch on the right rear wheel side, which is the outside turning wheel of left and right rear wheels 15 and 16, is engaged when accelerating while turning, the drive power transfer loss is appropriately reduced and the cornering performance can be improved.

Effect 3: Rear final gear mechanism 10 is fixed to second hypoid gear 27 provided on the end of propeller shaft 9 and cylindrical differential case 28 that is the central axis of axle RL of left and right rear wheels 15 and 16 and is comprised of second hypoid gear 27 and second ring gear 29 that engages with second hypoid gear 27. Cylindrical differential case 28 is provided with partition wall 30 positioned in its middle portion on the inner surface of the cylinder. First clutch chamber 31 and second clutch chamber 32 are formed separately from the partition wall 30, and first clutch 11 is disposed in first clutch chamber 31 and second clutch 12 is disposed in second clutch chamber 32 so as to ensure that partition wall 30 serves to receive the reactive force of clutches 11 and 12 and allow for first clutch 11 and second clutch 12 to be compactly housed inside of cylindrical differential case 28.

Effect 4: Since first clutch 11 is a multiple disk clutch with first spline teeth 33a formed on the inner surface of first clutch chamber 31 of cylindrical differential case 28 and first main clutch plate 37 inserted between the ends of left rear wheel drive shaft 13, which is inserted into first clutch chamber 31, and second clutch 12 is a multiple disk clutch with second spline teeth 33b formed on the inner surface of second clutch chamber 32 of cylindrical differential case 28 and second main clutch plate 47 inserted between the ends of right rear wheel drive shaft 14, which is inserted into second clutch chamber 32, the function whereby clutch plates 37 and 47 are mated together is ensured while allowing for first clutch 11 and second clutch 12 to be compactly housed inside of cylindrical differential case 28.

Effect 5: Since cylindrical differential case 28 forms a plurality of through holes 30a that penetrate through partition wall 30 in the axial direction and also forms shared spline teeth 33 shared by first spline teeth 33a and second spline teeth 33b along the entire length of the case only at the portion where the plurality of through holes 30a are formed, improved workability can be achieved in the spline processing and a lighter device can be realized.

Effect 6: Since first clutch 11 and second clutch 12 each comprise pilot clutch plates 35 and 45 that generate constraining torque in accordance with the coil current command sent to electromagnets 34 and 44, ball cams 36 and 46 that generate the cam force in accordance with the constraining torque of pilot clutch plates 35 and 45, and main clutch plates 37 and 47 that generate the transfer torque by means of the thrust from the cam force of ball cams 36 and 46, first clutch 11 and second clutch 12, including the clutch control actuator, can be more compactly housed into the unit than if a motor-type clutch or a hydraulic-type clutch were used.

Embodiment 2 is an example of a motor-type clutch in which the motor of clutch 1 and clutch 2 functions as an actuator.

Figure 5:
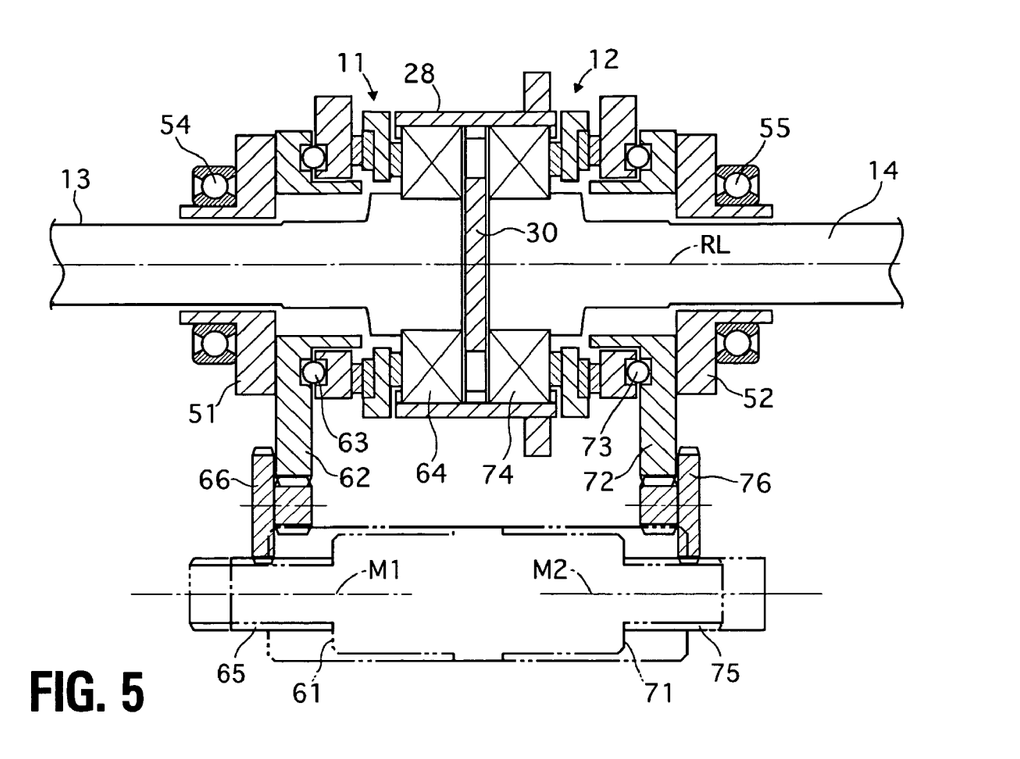
FIG. 5 is a cross-sectional diagram showing the rear final gear mechanism and the rear clutch mechanism of the rear wheel power transfer pathway for Embodiment 2.

As shown in FIG. 5, first clutch 11 comprises first ball cam 63 that generates the cam force via first cam plate 62 in accordance with the drive command sent to first motor 61 and first clutch plate 64 that generates the transfer torque by means of the thrust from the cam force of first ball cam 63. Second clutch 12 comprises second ball cam 73 that generates the cam force via second cam plate 72 in accordance with the drive command sent to second motor 71 and second clutch plate 74 that generates the transfer torque by means of the thrust from the cam force of second ball cam 73.

Figure 6:
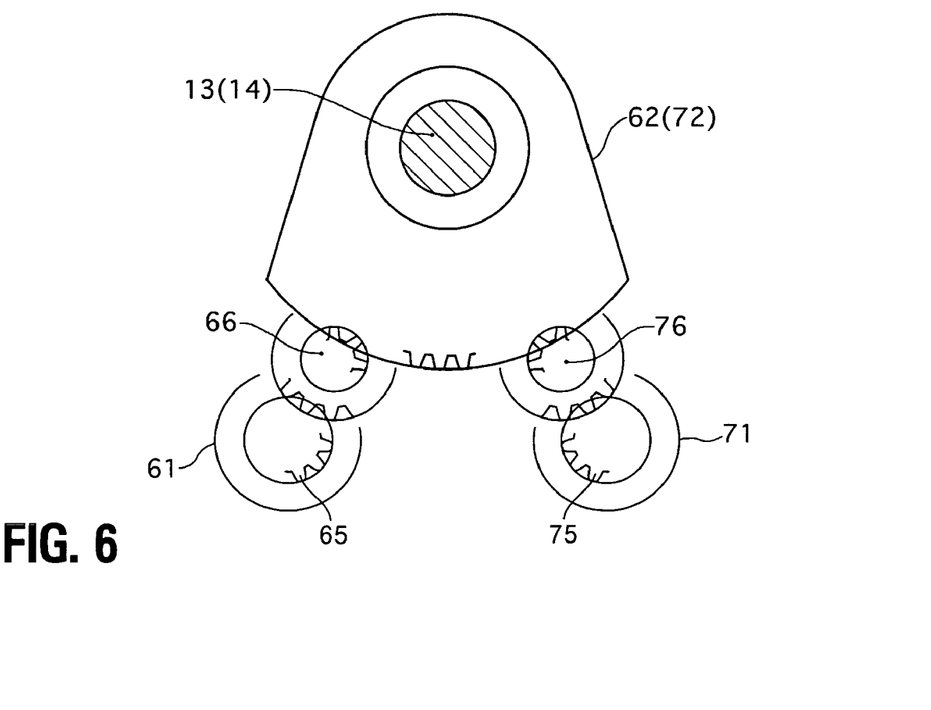
FIG. 6 is a side view of the positional relationship between the first motor of the first clutch and the second motor of the second clutch for Embodiment 2.

As shown in FIG. 5, for first motor 61 of first clutch 11 and second motor 71 of second clutch 12, first motor axis M1 and second motor axis M2 are parallel to axle RL of left and right rear wheels 15 and 16, and as shown in FIG. 6, are disposed so as to overlap with one another in the circumferential direction by differing the positions in which first cam plate 62 and second cam plate 72 engage with one another on their circumference.

First motor gear 65 and first cam plate 62 provided on the motor shaft of first motor 61 engage via first decelerating gear 66. Second motor gear 75 and second cam plate 72 provided on the motor shaft of second motor 71 engage via second decelerating gear 76. The rest of the constitution for Embodiment 2 is the same as that of Embodiment 1, so an explanation has been omitted for the same reference symbols that correspond to the same constitution.

Figure 7:
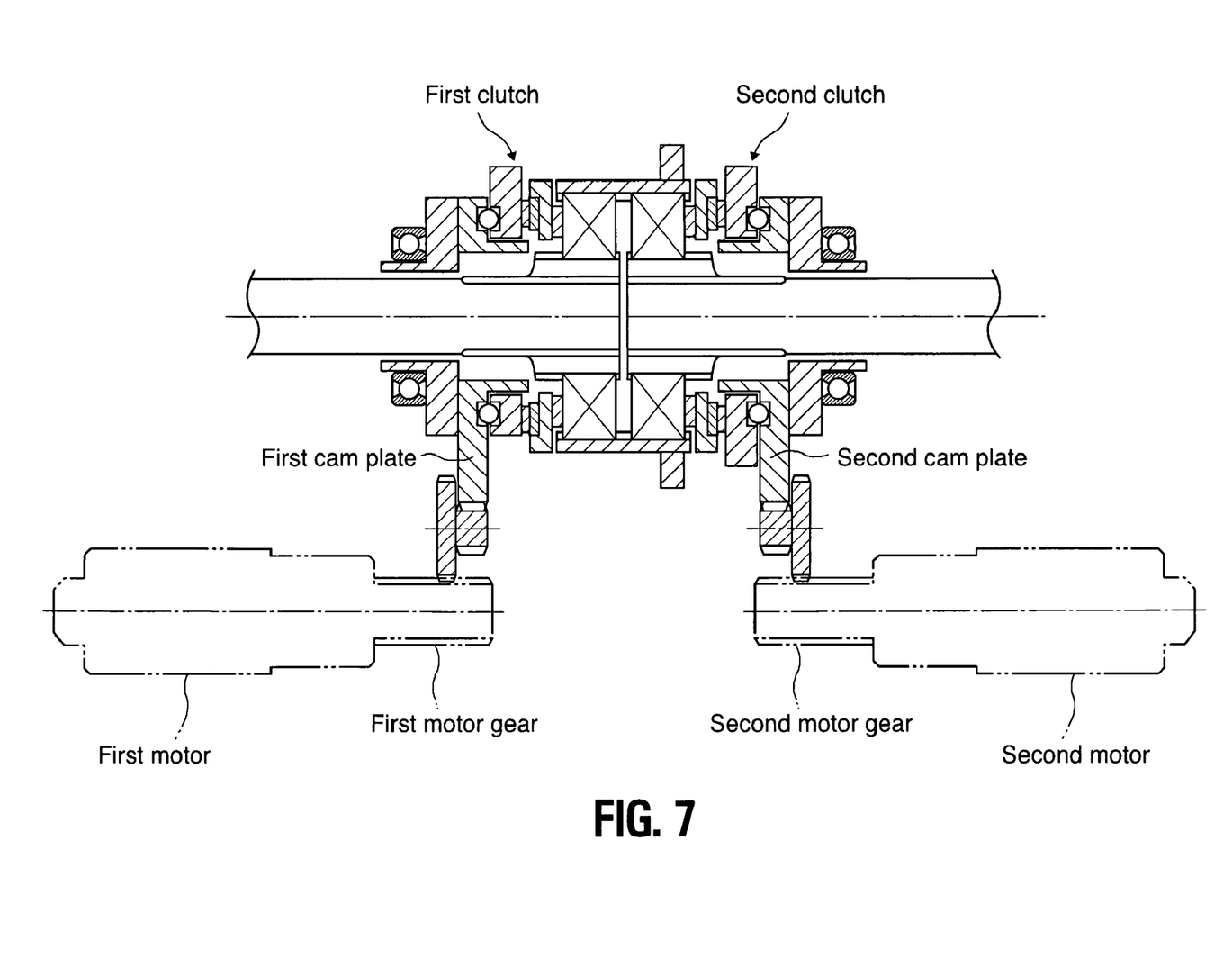
FIG. 7 is a cross section diagram showing an example of a conventional rear final gear mechanism and the rear clutch mechanism of the rear wheel power transfer pathway for when a motor-type clutch is used.

When 2 motors are provided in the same position in the circumferential direction so as to not interfere with one another in relation to the two clutches, as shown in FIG. 7, the first clutch and the second clutch and the first motor gear and the second motor gear are positioned inward facing one another and the rear ends of the first and second motors are both positioned to face outward. In this case, the space occupied by the two motors expands in the axial direction and creates a problem by interfering with the surrounding members, resulting is less freedom in the layout of the constitution.

On the other hand, for the drive distribution device in Embodiment 2, the two motor axes M1 and M2 are parallel to axle RL of left and right rear wheels 15 and 16, and are disposed so as to overlap with one another in the circumferential direction by differing the positions in which first cam plate 62 and second cam plate 72 engage with one another on their circumference so that the space in the axial direction that is occupied by the two motors, as shown in FIG. 5, is reduced substantially compared to that shown in FIG. 7, the freedom in constituting the layout is improved, and the problem of interfering with the surrounding members can be avoided. The drive power distribution control operation for Embodiment 2 is the same as that for Embodiment 1 so further explanation has been omitted.

For the vehicle drive power distribution device for Embodiment 2, in addition to Effects 1-5 described above in conjunction with Embodiment 1, the following effect can also be achieved.

Effect 7: Since first clutch 11 and second clutch 12 each comprise ball cams 63 and 73 that generate the cam force via cam plates 62 and 72, in accordance with the drive command sent to motors 61 and 71, and clutch plates 64 and 74 that generate the transfer torque by means of the thrust from the cam force of said ball cams 63 and 73 and since the two motor axes M1 and M2 of first motor 61 of first clutch 11 and second motor 71 of second clutch 12 are parallel to axle RL of left and right rear wheels 15 and 16 and are disposed so as to overlap with one another in the circumferential direction by differing the positions in which first cam plate 62 and second cam plate 72 engage with one another on their circumference, first clutch 11 and second clutch 12 can be compactly housed inside the unit, even though a motor-type clutch is used, and a great deal of freedom can be ensured in constituting the layout.

The vehicle drive power distribution device for the present invention has been explained based on Embodiments 1 and 2, but in terms of a specific constitution, the device is not limited to these embodiments and modifications and additions may be made to the design as long as they do not deviate from the gist of the invention pertaining to all of the claims of the present patent.

For the purposes of Embodiment 1, an example of a solenoid-type clutch was used for the first and second clutches and for Embodiment 2, an example of a motor-type clutch was used. However, a hydraulic-type clutch may also be used and essentially, as long as the first clutch and second clutch are independent variable control-type clutches that independently control the switching of the transfer torque from the outside, the present invention is not limited to Embodiment 1 or 2.

For the purposes of Embodiments 1 and 2, an example was provided in which the first and second clutches were built into the cylindrical differential case, but the first and second clutches could be set up independently of the drive output portion of the rear final gear mechanism and essentially, as long as the rear final gear mechanism is linked from its drive output portion to the rear wheel drive shaft via the first clutch and is linked from its drive output portion to the right rear wheel drive shaft via the second clutch, the present invention is not limited to Embodiment 1 or 2.

For the purposes of Embodiments 1 and 2, the drive power distribution device for an engine-type vehicle loaded with only an engine as the drive power source was shown, but the present invention could also be applied to a hybrid vehicle loaded with an engine and a motor as the drive power source or an electrically-powered vehicle or fuel cell vehicle loaded with a motor as the drive power source. So, essentially, it can be applied to the drive power distribution device for a vehicle equipped with a front wheel power transfer pathway that transfers the drive power from the power source to the left and right front wheels and a rear wheel power transfer pathway that transfers the drive power from the power source to the left and right rear wheels via a clutch.

What is claimed is:

1. A vehicle drive power distribution device in which left and right front wheels thereof and left and right rear wheels thereof are driven by a drive power source, the vehicle drive power distribution device comprising:
   a transfer mechanism including a gear mechanism that distributes drive power from the drive power source to the left and right front wheels and left and right rear wheels;
   a rear differential mechanism including a gear mechanism that transfers the drive power transferred from the drive power source via the transfer mechanism to the left and right rear wheels;
   a first clutch provided between the rear differential mechanism and the left rear wheel;
   a second clutch provided between the rear differential mechanism and the right rear wheel;
   a control device that independently controls an engaged state of the first clutch and an engaged state of the second clutch;
   a propeller shaft having a first end directly linked to the transfer mechanism and a second end directly linked to the rear differential mechanism, such that the first end of the propeller shaft is an output shaft of the transfer mechanism and the second end of the propeller shaft is an input shaft of the rear differential mechanism; and
   a speed-increasing mechanism including a gear ratio of at least one of the gear mechanisms of the transfer mechanism and the rear differential mechanism such that the speed-increasing mechanism sets a revolution speed of the output shaft of the transfer mechanism and a revolution speed of the input shaft of the rear differential mechanism to be the same and sets a speed of the outer circumference of the rear wheel to which the drive power is transferred via the engaged clutch to be faster than a speed of the outer circumference of the left and right front wheels, while at least one of either the first or second clutches is in the engaged state.

2. The drive power distribution device according to claim 1 further comprising:
   a front differential mechanism that transfers the drive power from the drive power source to the left and right front wheels, wherein the transfer mechanism is linked to the front differential mechanism.

3. A vehicle drive power distribution device in which left and right front wheels thereof and left and right rear wheels thereof are driven by a drive power source, the vehicle drive power distribution device comprising:
   a front wheel power transfer pathway that transfers drive power from the drive power source to the left and right front wheels;
   a rear wheel power transfer pathway that transfers the drive power from the drive power source to the left and right rear wheels; and
   a linking pathway that links the front wheel power transfer pathway to the rear wheel power transfer pathway;
   wherein the linking pathway consists only of a transfer gear mechanism and a propeller shaft, the propeller shaft having a first end directly linked to the transfer gear mechanism and a second end directly linked to the rear wheel power transfer pathway such that the first end of the propeller shaft is an output shaft of the transfer gear mechanism and the second end of the propeller shaft is an input shaft of the rear wheel power transfer pathway;
   wherein the rear wheel power transfer pathway comprises a rear final gear mechanism that is linked to the linking pathway, a left rear wheel drive shaft that is linked to the rear final gear mechanism via a first clutch, and a right rear wheel drive shaft that is linked to the rear final gear mechanism via a second clutch;
   wherein at least one of a transfer mechanism gear ratio and a rear final gear mechanism gear ratio is a speed-increasing gear ratio that increases the speed of the left and right rear wheels more than that of the left and right front wheels; and
   wherein the first clutch and the second clutch are independent variable control type clutches that control the drive power that is independently transferred by each clutch.

4. The vehicle drive power distribution device according to claim 3, wherein
   the front wheel power transfer pathway comprises a front differential gear mechanism provided between the drive power source and the left and right front wheels, and the front differential gear mechanism is linked to the transfer gear mechanism.

5. The vehicle drive power distribution device according to claim 3, wherein
   the front wheel power transfer pathway is linked to the transfer gear mechanism.

6. The vehicle drive power distribution device according to claim 3, wherein
   the speed-increasing gear ratio is set to increase the speed of the rear wheels by about 2 to about 5 percent more than that of the front wheels.

7. The vehicle drive power distribution device according to claim 3, wherein
   the rear final gear mechanism comprises a hypoid gear provided on an end of the propeller shaft and a ring gear that engages with the hypoid gear, the ring gear fixed to a cylindrical differential case.

8. The vehicle drive power distribution device according to claim 7, wherein
   a partition wall is provided in the middle of an inner surface of the cylinder of the cylindrical differential case and a first clutch chamber and a second clutch chamber are formed separately on either side of the partition wall, the first clutch is disposed in the first clutch chamber and the second clutch is disposed in the second clutch chamber.

9. The vehicle drive power distribution device according to claim 8, wherein
   the first clutch is a multiple disk clutch comprising a first clutch plate inserted between first spline teeth formed on the inner surface of the first clutch chamber of the cylindrical differential case and an end of the left rear wheel drive shaft which is inserted into the first clutch chamber, and wherein the second clutch is a multiple disk clutch comprising a second clutch plate inserted between second spline teeth formed on the inner surface of the second clutch chamber of the cylindrical differential case and an end of the right rear wheel drive shaft which is inserted into the second clutch chamber.

10. The vehicle drive power distribution device according to claim 9, wherein
the cylindrical differential case forms a plurality of through holes that penetrate through the partition wall in an axial direction, the cylindrical differential case also forms shared spline teeth shared by the first and second spline teeth along an entire length of the case only at a portion where the plurality of through holes are formed.

11. The vehicle drive power distribution device according to claim 3, wherein
the first and second clutches each comprise a pilot clutch plate that generates constraining torque in accordance with a coil current command sent to an electromagnet of the respective clutch, a ball cam that generates cam force in accordance with the constraining torque of the pilot clutch plate, and a main clutch plate that generates transfer torque by means of thrust from the cam force of the ball cam.

12. The vehicle drive power distribution device according to claim 3, wherein
the first and second clutches each comprise a motor that is driven in accordance with a drive command, a cam plate that is driven by the motor, a ball cam that generates a cam force via a cam plate and a clutch plate that generates transfer torque by means of thrust from the cam force of the ball cam, and wherein a first motor shaft for the motor of the first clutch and a second motor shaft for the motor of the second clutch are parallel with an axle of the left and right rear wheels and are arranged so as to overlap with one another in a circumferential direction by differing positions in which the cam plate of the first clutch and the cam plate of the second clutch engage with one another on their circumference.

13. A vehicle drive power distribution device in which left and right front wheels thereof and left and right rear wheels thereof are driven by a drive power source, the vehicle drive power distribution device comprising:
a transfer mechanism including a gear mechanism that distributes drive power from the drive power source to the left and right front wheels and left and right rear wheels;
a rear differential mechanism including a gear mechanism that transfers the drive power transferred from the drive power source via the transfer mechanism to the left and right rear wheels;
a first clutch provided between the rear differential mechanism and the left rear wheel;
a second clutch provided between the rear differential mechanism and the right rear wheel;
a control device that independently controls an engaged state of the first clutch and an engaged state of the second clutch;
a propeller shaft having a first end directly linked to the transfer mechanism and a second end directly linked to the rear differential mechanism, such that the first end of the propeller shaft is an output shaft of the transfer mechanism and the second end of the propeller shaft is an input shaft of the rear differential mechanism; and
a speed-increasing mechanism including a gear ratio of at least one of the gear mechanisms of the transfer mechanism and the rear differential mechanism such that the speed-increasing mechanism sets a revolution speed of the output shaft of the transfer mechanism and a revolution speed of the input shaft of the rear differential mechanism to be the same and sets a revolution speed of an output shaft of the engaged clutch to be larger than that of the input shaft of the transfer mechanism while at least one of either the first clutch or second clutch is in the engaged state.

14. A vehicle drive power distribution device in which left and right front wheels thereof and left and right rear wheels thereof are driven by a drive power source, the vehicle drive power distribution device comprising:
a transfer mechanism including a gear mechanism that distributes drive power from the drive power source to the left and right front wheels and left and right rear wheels;
a rear differential mechanism including a gear mechanism that transfers the drive power transferred from the drive power source via the transfer mechanism to the left and right rear wheels;
a first clutch provided between the rear differential mechanism and the left rear wheel;
a second clutch provided between the rear differential mechanism and the right rear wheel;
a control device that independently controls an engaged state of the first clutch and an engaged state of the second clutch;
a propeller shaft having a first end directly linked to the transfer mechanism and a second end directly linked to the rear differential mechanism, such that the first end of the propeller shaft is an output shaft of the transfer mechanism and the second end of the propeller shaft is an input shaft of the rear differential mechanism; and
a speed-increasing mechanism including a gear ratio of at least one of the gear mechanisms of the transfer mechanism and the rear differential mechanism such that the speed-increasing mechanism sets a revolution speed of the output shaft of the transfer mechanism and a revolution speed of the input shaft of the rear differential mechanism to be the same and sets a revolution speed of the rear wheel to which the drive power is transferred via the engaged clutch to be faster than a revolution speed of the left and right front wheels while at least one of either the first or second clutch is in the engaged state.

15. A vehicle drive power distribution device in which left and right front wheels thereof and left and right rear wheels thereof are driven by a drive power source, the vehicle drive power distribution device comprising:
a drive power distribution means including a gear mechanism that distributes drive power from the drive power source to the left and right front wheels and left and right rear wheels;
a rear-wheel-side drive power transfer means including a gear mechanism that transfers the drive power distributed by the drive power distribution means to the left and right rear wheels;
a first transfer power control means that controls the drive power transferred to the left rear wheel from the rear-wheel-side drive power transfer means;
a second transfer power control means that controls the drive power transferred to the right rear wheel from the rear-wheel-side drive power transfer means;
a linking means having a first end directly linked to the drive power distribution means and a second end directly linked to the rear-wheel-side drive power transfer means, such that the first end of the linking means is an output shaft of the drive power distribution means and the second end of the linking means is an input shaft of the rear-wheel-side drive power transfer means; and
a speed-increasing means including a gear ratio of at least one of the gear mechanisms of the drive power distribution means and the rear-wheel-side drive power transfer means such that the speed-increasing means sets revolution speeds of an output shaft of the drive power distribution means and an input shaft of the rear-wheel-side drive power transfer means to be the same, and sets a speed of the left and right rear wheels to be faster than that of the left and right front wheels.

16. A vehicle drive power distribution device in which left and right front wheels thereof and left and right rear wheels thereof are driven by a drive power source, the vehicle drive power distribution device comprising:

means for distributing drive power from the drive power source to the left and right front wheels and left and right rear wheels;

means for transferring the drive power distributed by the drive power distributing means to the left and right rear wheels;

means for controlling the drive power transferred to the left rear wheel from the drive power transferring means;

means for controlling the drive power transferred to the right rear wheel from the drive power transferring means;

means for directly linking an output shaft of the means for distributing drive power and an input shaft of the means for transferring the drive power; and means for setting revolution speeds of the output shaft of the drive power distribution means and the input shaft of the drive power transferring means to be the same, and for setting speed of the left and right rear wheels to be faster than that of the left and right front wheels the means for setting revolution speeds including a gear ratio of at least one of the gear mechanisms of the means for distributing drive power and the means for transferring the drive power.

* * * * *